(12) United States Patent
Shintani et al.

(10) Patent No.: US 9,955,235 B2
(45) Date of Patent: Apr. 24, 2018

(54) SYSTEM AND METHOD TO COMMUNICATE AN EMERGENCY ALERT MESSAGE

(71) Applicant: SONY CORPORATION, Tokyo (JP)

(72) Inventors: Peter Shintani, San Diego, CA (US); Robert Blanchard, Escondido, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/970,374

(22) Filed: Dec. 15, 2015

(65) Prior Publication Data

US 2017/0171640 A1    Jun. 15, 2017

(51) Int. Cl.
| | |
|---|---|
| H04N 7/10 | (2006.01) |
| H04N 7/025 | (2006.01) |
| H04N 21/81 | (2011.01) |
| H04N 21/235 | (2011.01) |
| H04W 4/22 | (2009.01) |
| H04W 76/00 | (2018.01) |

(52) U.S. Cl.
CPC ....... *H04N 21/814* (2013.01); *H04N 21/2353* (2013.01); *H04W 4/22* (2013.01); *H04W 76/007* (2013.01)

(58) Field of Classification Search
CPC .................................................. H04N 21/814
USPC ............................................................ 725/33
See application file for complete search history.

(56) References Cited

U.S. PATENT DOCUMENTS

| | | | |
|---|---|---|---|
| 7,671,732 B1 | 3/2010 | Sennett et al. | |
| 8,208,891 B2 | 6/2012 | Jacobs et al. | |
| 8,730,028 B2 | 5/2014 | Putterman et al. | |
| 2004/0006694 A1 | 1/2004 | Heelan et al. | |
| 2008/0070546 A1* | 3/2008 | Lee ....................... | G08B 25/016 455/404.2 |

(Continued)

FOREIGN PATENT DOCUMENTS

| | | |
|---|---|---|
| EP | 2332353 A1 | 6/2011 |
| ES | 2388999 T3 | 10/2012 |

(Continued)

OTHER PUBLICATIONS

Linda K. Moore, The Emergency Alert System (EAS) and All-Hazard Warnings, Aug. 26, 2010, pp. 15, Congressional Research Service.

(Continued)

*Primary Examiner* — Kyu Chae
(74) *Attorney, Agent, or Firm* — Chip Law Group

(57) ABSTRACT

Various aspects of a system related to communication of emergency alert messages are disclosed herein. The system comprises one or more circuits in an electronic device communicatively coupled to a broadcast server. The one or more circuits are configured to register one or more output preferences based on one or more input parameters provided by a user. An emergency alert message and associated metadata of an emergency event is received from the broadcast server. The associated metadata includes time-sensitive information of the emergency event. Based on the associated metadata and the registered one or more output preferences, the received emergency alert message is modified to a user-accessible format. According to the registered one or more output preferences, the modified emergency alert message is communicated to the user.

24 Claims, 6 Drawing Sheets

(56) References Cited

U.S. PATENT DOCUMENTS

| | | | | |
|---|---|---|---|---|
| 2010/0107192 | A1* | 4/2010 | Sennett | G08B 6/00 725/33 |
| 2010/0211972 | A1* | 8/2010 | Howarter | G08B 27/008 725/33 |
| 2011/0159839 | A1 | 6/2011 | McEwen et al. | |
| 2011/0258266 | A1 | 10/2011 | Serra et al. | |
| 2011/0313770 | A1* | 12/2011 | Pottle | G08B 5/226 704/258 |
| 2012/0154157 | A1* | 6/2012 | George | G08B 21/02 340/584 |
| 2012/0185897 | A1 | 7/2012 | Gould et al. | |
| 2013/0063668 | A1* | 3/2013 | Yamashita | H04N 21/4221 348/738 |
| 2013/0281047 | A1 | 10/2013 | Daly et al. | |
| 2014/0354442 | A1* | 12/2014 | Maity | G08B 27/005 340/691.6 |
| 2015/0339912 | A1* | 11/2015 | Farrand | G08B 25/00 340/501 |
| 2016/0050038 | A1 | 2/2016 | Daly et al. | |
| 2016/0314403 | A1* | 10/2016 | Chakraborty | H04L 41/00 |
| 2017/0085327 | A1 | 3/2017 | Daly et al. | |

FOREIGN PATENT DOCUMENTS

| | | |
|---|---|---|
| GB | 2474216 A | 4/2011 |
| JP | 2004-336413 A | 11/2004 |
| JP | 2006-148541 A | 6/2006 |
| JP | 2007-243438 A | 9/2007 |
| JP | 2012-113170 A | 6/2012 |
| JP | 2013-118499 A | 6/2013 |
| JP | 2013-143743 A | 7/2013 |
| JP | 2015-170162 A | 9/2015 |
| WO | 2010/007412 A1 | 1/2010 |

OTHER PUBLICATIONS

Extended European Search Report of EP Patent Application No. 16202744.5, dated May 12, 2017, 08 pages.

Office Action for JP Patent Application No. 2016-243122, dated Jan. 31, 2018, 05 pages of Office Action and 05 pages of English Translation.

\* cited by examiner

SYSTEM AND METHOD TO COMMUNICATE AN EMERGENCY ALERT MESSAGE

CROSS-REFERENCE TO RELATED APPLICATIONS/INCORPORATION BY REFERENCE

None

FIELD

Various embodiments of the disclosure relate to communication systems. More specifically, various embodiments of the disclosure relate to a system and a method for communication of an emergency alert message to users in a user-accessible format.

BACKGROUND

Advancements in the field of communication systems have led to rapid development in methods for communication of emergency alert messages. The emergency alert messages may be broadcasted by a broadcast service, such as Cell Broadcast, Multimedia Broadcast/Multicast Service (MBMS), Digital Video broadcast-Handheld (DVB-H), and/or MediaFLO™.

In certain scenarios, the emergency alert messages broadcasted by the broadcast service may not be accessed by a user due to certain disability, such as a visual disability, a hearing disability, a cognitive disability, and/or a combination thereof. Therefore, the emergency alert messages may not be suitably perceived by such differently abled users. In certain scenarios, the emergency alert messages may correspond to life-threatening implications, and thus, timely communication of such emergency alert messages may be crucial. Thus, it may be desirable that such emergency alert messages are communicated to such differently abled users in an accessible and perceivable format.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to communicate an emergency alert message may be provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
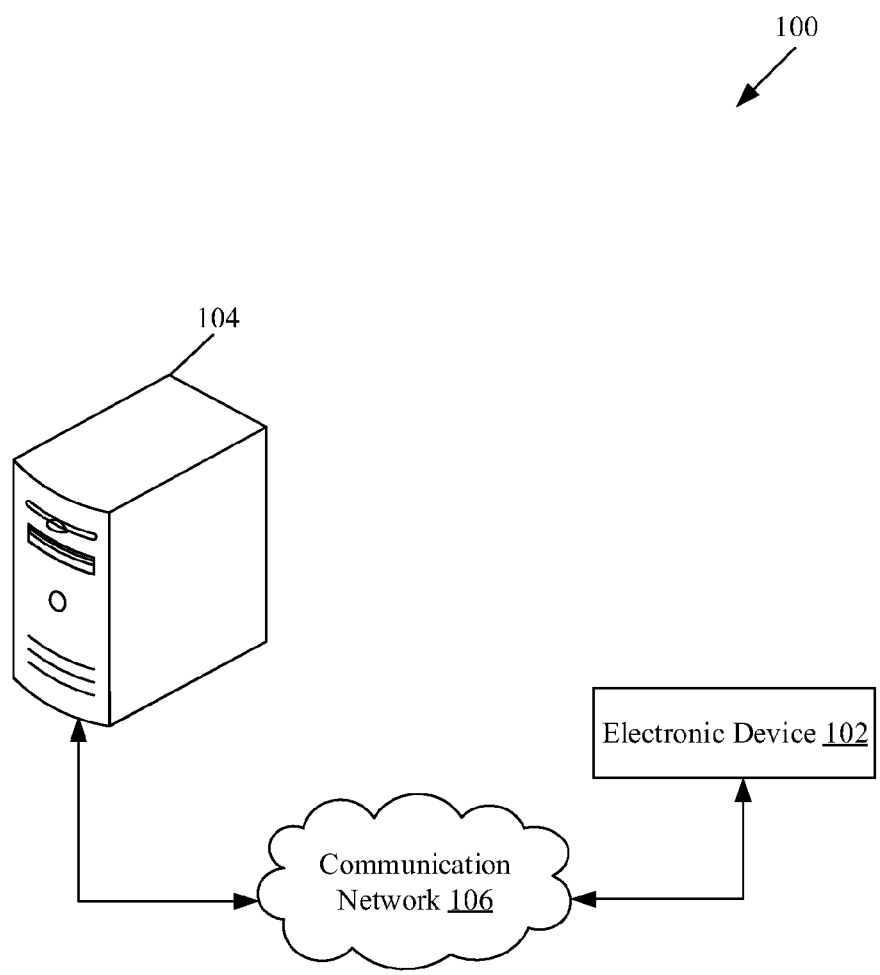
FIG. 1 is a block diagram that illustrates a network environment to communicate an emergency alert message, in accordance with an embodiment of the disclosure.

Various implementations may be found in a system and/or a method to communicate an emergency alert message. The method may be implemented in an electronic device communicatively coupled to a broadcast server. The method may include registration of one or more output preferences based on one or more input parameters provided by a user. An emergency alert message and associated metadata of an emergency event may be received from the broadcast server. In accordance with an embodiment, the associated metadata may include time-sensitive information of the emergency event. The received emergency alert message may be modified to the user-accessible format, based on the associated metadata and the registered one or more output preferences. The modified emergency alert message may be communicated to the user in accordance with the registered one or more output preferences.

In accordance with an embodiment, the modified emergency alert message may be displayed on a display screen of the electronic device. In accordance with an embodiment, the one or more input parameters may be received via one or more sensors coupled to the electronic device. In accordance with an embodiment, the modified emergency alert message may be transmitted to another electronic device.

In accordance with an embodiment, the modification of the received emergency alert message may comprise conversion of the emergency alert message into an audio message. In such a case, one or more audio properties of the audio message may be controlled, based on one or more environmental factors and the one or more input parameters. In accordance with an embodiment, the one or more environmental factors may comprise a background noise, a location of the electronic device, and an altitude of the electronic device.

In accordance with an embodiment, the modification of the received emergency alert message may comprise conversion of the emergency alert message into a visual message. In such a case, the one or more visual properties associated with the visual message may be controlled, based on ambient illumination and the one or more input parameters. In accordance with an embodiment, the visual message may comprise a textual content and/or a graphical content.

In accordance with an embodiment, the modification of the received emergency alert message may comprise conversion of the received emergency alert message into a tactile message. In such a case, the converted tactile message may be transmitted to a tactile message reader.

In accordance with an embodiment, the one or more input parameters may correspond to one or more disabilities associated with the user. The one or more disabilities may comprise a visual disability, a hearing disability, and/or a cognitive disability. In accordance with an embodiment, a level of disability may be associated with each of the one or more input parameters. The one or more output preferences may comprise an audio message, a visual message, and/or a tactile message.

In accordance with another aspect of the disclosure, a method for communication of emergency alert messages may be implemented in a broadcast server communicatively coupled to a plurality of electronic devices. The method may include broadcasting of an emergency alert message and associated metadata of an emergency event. The associated metadata may include time-sensitive information of the emergency event. The broadcasted emergency alert message may be modified to a user-accessible format based on the associated metadata and one or more output preferences registered at each of the plurality of electronic devices. The one or more output preferences may be registered based on one or more input parameters provided by a user. The method may further revoke the broadcasted emergency alert message and associated metadata of the emergency event after expiry of the time-sensitive information.

FIG. 1 is a block diagram that illustrates a network environment to communicate an emergency alert message, in accordance with an embodiment of the disclosure. With reference to FIG. 1, there is shown a network environment 100. The network environment 100 may include an electronic device 102, a broadcast server 104, and a communication network 106. The electronic device 102 and the broadcast server 104 may be communicatively coupled with each other, via the communication network 106.

The electronic device 102 may comprise suitable logic, circuitry, interfaces, and/or code that may be configured to register one or more output preferences, based on one or more input parameters provided by a user. The electronic device 102 may be further configured to receive an emergency alert message and associated metadata of an emergency event from the broadcast server 104. The electronic device 102 may be further configured to modify the received emergency alert message to a user-accessible format, based on the associated metadata and the registered one or more output preferences. The electronic device 102 may be further configured to communicate the modified emergency alert message to the user in accordance with the registered one or more output preferences. Examples of electronic device 102 may include a personal computer, a laptop, a personal digital assistant (PDA), a mobile device, a tablet, or other such computing device.

The broadcast server 104 may comprise suitable logic, circuitry, interfaces, and/or code that may be configured to generate an emergency alert message and associated metadata of an emergency event. The broadcast server 104 may be further configured to store the emergency alert message and the associated metadata in a local memory. The broadcast server 104 may be further configured to broadcast the emergency alert message and the associated metadata to a plurality of electronic devices. The broadcast server 104 may be further configured to revoke the broadcasted emergency alert message and the associated metadata of the emergency event after the time-sensitive information specified in the metadata has expired. The broadcast server 104 may be associated with one or more other servers, such as a social networking server, a live-streaming server, and/or an application server, to retrieve the emergency alert message.

The broadcast server 104 may be implemented as a single server or as a cluster of servers. The broadcast server 104 may be implemented as a cloud server, which may be dynamically configured. The broadcast server 104 may be implemented by use of several technologies that are well known to those skilled in the art. Examples of the broadcast server 104 may include Apache™ HTTP Server, Microsoft® Internet Information Services (IIS), IBM® Application Server, and/or Sun Java™ System Web Server. In accordance with an embodiment, the broadcast server 104 may communicate with the electronic device 102 based on one or more protocols. Examples of such one or more protocols may include, but are not limited to, Open Database Connectivity (ODBC)® protocol and Java Database Connectivity (JDBC)® protocol.

The communication network 106 may include a medium through which the broadcast server 104 and the electronic device 102 may communicate with each other. Examples of the communication network 106 may include, but are not limited to, the Internet, a cloud network, a Long Term Evolution (LTE) network, a Wireless Fidelity (Wi-Fi) network, a Wireless Local Area Network (WLAN), a Local Area Network (LAN), a Plain Old Telephone Service (POTS), and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the electronic device 102 may be configured to receive one or more input parameters provided by a user. In accordance with an embodiment, the one or more input parameters may correspond to one or more disabilities associated with the user. The one or more disabilities may comprise a visual disability, a hearing disability, a cognitive disability, and/or a combination thereof. Each of the one or more input parameters may include a level of disability associated with the user. In accordance with an embodiment, the electronic device 102 may comprise one or more sensors to detect the level of disability associated with the user. Based on the one or more input parameters, the electronic device 102 may register the one or more output preferences. In accordance with an embodiment, the one or more output preferences may comprise an audio message, a visual message, and/or a tactile message.

In accordance with an embodiment, the broadcast server 104 may detect the emergency event based on status of one or more emergency sensors installed at one or more locations. Examples of such one or more emergency sensors may comprise, but are not limited to, an air pressure sensor, an anemometer, and an acoustic sensor. In accordance with an embodiment, the broadcast server 104 may receive one or more readings from the one or more emergency sensors. Based on the one or more readings, the broadcast server 104 may detect the emergency event. In accordance with an embodiment, when an emergency event is detected by the broadcast server 104, the broadcast server 104 may generate an emergency alert message.

In accordance with an embodiment, the broadcast server 104 may broadcast the generated emergency alert message and associated metadata of the emergency event to a plurality of electronic devices that include the electronic device 102. In accordance with an embodiment, the associated metadata may include time-sensitive information of the emergency event. In accordance with an embodiment, the emergency alert message and the associated metadata of the emergency event broadcasted by the broadcast server 104 may be received by the electronic device 102. In response to the receipt of the emergency alert message and the associated metadata of the emergency event, the electronic device 102 may modify the received emergency alert message to a user-accessible format, based on the associated metadata and the registered one or more output preferences.

In accordance with an embodiment, the electronic device 102 may be configured to perform modifications, such that the received emergency alert message is perceivable by the user. In accordance with a first example, the received emergency alert message may be converted into an audio message. Additionally, the electronic device 102 may be configured to control one or more audio properties of the audio message, based on one or more environmental factors, the one or more input parameters, and the level of disability. Examples of the one or more environmental factors may comprise, but not limited to, background noise, a location of the electronic device 102, and an altitude at which the electronic device 102 is located.

In accordance with a second example, the received emergency alert message may be converted into a visual message. Additionally, the electronic device 102 may be configured to control one or more visual properties associated with the visual message, based on ambient illumination, the one or more input parameters, and the level of disability. In accordance with an embodiment, the visual message may comprise textual content, graphical content, and/or a combination thereof. In accordance with a third example, the received emergency alert message may be converted into a tactile message, such as a braille message.

After modification of the received emergency alert message, in accordance with the embodiments described herein, the electronic device 102 may be configured to communicate the modified emergency alert message to the user, in accordance with the registered one or more output preferences. In accordance with the first example, the electronic device 102 may be configured to display the modified emergency alert message (that is the visual message) on a display screen of the electronic device 102. In accordance with the second example, the electronic device 102 may be configured to playback the modified emergency alert message (that is the audio message), via the speakers. In accordance with the third example, the electronic device 102 may be configured to transmit the modified emergency alert message (that is the tactile message) to another electronic device. In such a case, the electronic device may be a tactile message reader, such as braille reader.

In accordance with an embodiment, after the time-sensitive information included in the metadata has expired, the broadcast server 104 may be configured to revoke the broadcasted emergency alert message from the electronic device 102.

Figure 2:
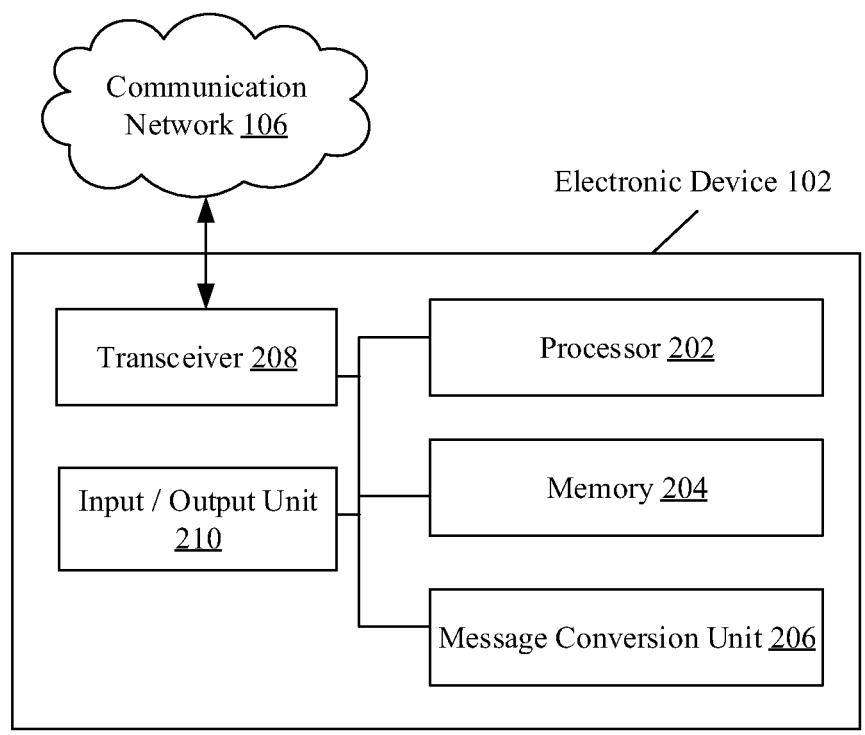
FIG. 2 is a block diagram that illustrates various components of an electronic device utilized to communicate an emergency alert message in a user-accessible format, in accordance with an embodiment of the disclosure.

FIG. 2 is a block diagram that illustrates various components of an electronic device, utilized to communicate the emergency alert message in the user-accessible format, in accordance with an embodiment of the disclosure. With reference to FIG. 2, there is shown the electronic device 102. The electronic device 102 may comprise one or more processors, such as a processor 202, a memory 204, a message conversion unit 206, a transceiver 208, and an input/output unit 210. The processor 202 may be communicatively coupled to the memory 204, the message conversion unit 206, the transceiver 208, and the input/output unit 210.

The processor 202 may comprise suitable logic, circuitry, interfaces, and/or code that may be configured to execute a set of instructions stored in the memory 204. The processor 202, in conjunction with the message conversion unit 206 may be configured to modify the emergency alert message in the user-accessible format. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may comprise suitable logic, circuitry, interfaces, and/or code that may be configured to store the set of instructions, which may be executed by the processor 202. The memory 204 may be further configured to store one or more message conversion techniques (known in the art) for conversion of emergency alert messages into the user-accessible format. The memory 204 may be further configured to store information related to one or more environmental factors. The memory 204 may be implemented based on a Random Access Memory (RAM), a Read-Only Memory (ROM), a Hard Disk Drive (HDD), a storage server, and/or a Secure Digital (SD) card.

The message conversion unit 206 may comprise suitable logic, circuitry, interfaces, and/or code that may be configured to convert the emergency alert message into the user-accessible format. In accordance with an embodiment, the message conversion unit 206 may be configured to implement the one or more message conversion techniques and/or algorithms which may be developed by use of one or more programming languages known in the art. The message conversion unit 206 may be implemented as an Application-Specific Integrated Circuit (ASIC) microchip designed for a special application, to perform one or more conversion operations on the emergency alert message.

The transceiver 208 may comprise suitable logic, circuitry, interfaces, and/or code that may be configured to receive the emergency alert message and associated metadata of the emergency event from the broadcast server 104, via the communication network 106. The transceiver 208 may implement known technologies to support wired or wireless communication with the communication network 106. The transceiver 208 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), a Long Term Evolution (LTE), wideband code division multiple access (W-CDMA), code division multiple access (CDMA), time division multiple access (TDMA), Bluetooth, Wireless Fidelity (Wi-Fi) (such as, IEEE 802.11a, IEEE 802.11b, IEEE 802.11g and/or IEEE 802.11n), voice over Internet Protocol (VoIP), Universal Serial Bus (USB) Protocol Wi-MAX, a protocol for email, instant messaging, and/or Short Message Service (SMS).

The input/output unit 210 may comprise suitable logic, circuitry, interfaces, and/or code that may be configured to receive an input or transmit an output to a user. In accordance with an embodiment, the input/output unit 210 may be configured to receive one or more input parameters from the user. The input/output unit 210 may comprise various input and output devices that may be configured to communicate with the processor 202. Examples of the input devices may include, but are not limited to, a keyboard, a mouse, a joystick, a touch screen, a microphone, a camera, and/or a docking station. Examples of the output devices may include, but are not limited to, the display screen and/or a speaker.

In operation, the processor 202 may be configured to automatically detect one or more input parameters, via one or more sensors. Examples of the one or more sensors may comprise an imaging sensor, a speech sensor, an ultrasonic sensor, and/or the like. In accordance with an embodiment, the processor 202 may be configured to receive the one or more input parameters provided manually by the user, via an input device, such as a touch-screen or a microphone. The one or more input parameters may correspond to one or more disabilities associated with the user. In accordance with an embodiment, the one or more disabilities may comprise a visual disability, a hearing disability, a cognitive disability, and/or a combination thereof.

In accordance with an embodiment, the one or more input parameters may include a level of disability that may be associated with the user. The user may provide the level of disability, via a user interface (UI) displayed on the electronic device 102. In accordance with an embodiment, the UI may comprise a slider. A position of the slider may be indicative of the level of disability associated with each of the one or more input parameters. In accordance with an embodiment, the UI may comprise a text box and the user may therein provide a number associated with the particular level of disability. For example, the user may enter the number (such as "70") for hearing disability in the text box, which may indicate that the level of disability of the user is "70 percent", thus, moderately severe.

In accordance with an embodiment, the processor 202 may check the level of disability based on one or more audio, visual, and/or sensory samples determined by one or more devices. Such one or more devices may perform various diagnostic procedures to determine such one or more audio, visual, and/or sensory samples. Examples of such diagnostic procedures may include, but are not limited to, a visual acuity test, a Weber test, and a Rinne test. For example, in accordance with a look up table, such as Table 1 as shown below, the processor 202 may determine the level of visual disability of the user. The level of visual disability may be determined based on visual samples, such as acuity strength of "20/100", determined by a computerized visual acuity measurement device. Accordingly, the processor 202 may display text of font size, "22", on the display screen. In accordance with an embodiment, the user may use the input/output unit 210 to select the text that is clearly visible to the user. Based on the font size of the selected text, the processor 202 may determine the level of visual disability of the user.

TABLE 1

| Acuity Strength | Level of Disability | Output preference (Font size) |
| --- | --- | --- |
| 20/200 | Profound | 24 |
| 20/100 | Severe | 22 |
| 20/70 | Moderately Severe | 20 |

TABLE 1-continued

| Acuity Strength | Level of Disability | Output preference (Font size) |
| --- | --- | --- |
| 20/50 | Moderate | 18 |
| 20/40 | Mild | 16 |
| 20/30 | Slight | 14 |
| 20/20 | Normal | 12 |

In accordance with Table 1, in an instance, an acuity strength of "20/200" indicates that the user has a profound level of visual disability and the font size of the emergency alert message may be set to "24", for example.

In another example, in accordance with another look up table, such as Table 2 as shown below, the processor 202 may determine the level of hearing disability of the user. The level of hearing disability may be based on audio samples, such as "82 dB", determined by an audiometer. Accordingly, the processor 202 may adjust volume of audio messages for the user. A person ordinary skilled in the art will understand that the hearing disability is measured in decibels (dB) based on pre-defined ranges.

TABLE 2

| Level of Disability | Hearing disability range (dB) |
| --- | --- |
| Normal | 0 to 15 |
| Slight | 16 to 25 |
| Mild | 26 to 40 |
| Moderate | 41 to 55 |
| Moderately severe | 56 to 70 |
| Severe | 71 to 90 |
| Profound | 91+ |

In accordance with Table 2, in an instance, the hearing disability of "80 dB" indicates that the user has a severe level of hearing disability.

In accordance with an embodiment, based on the one or more input parameters, the processor 202 may be configured to register the one or more output preferences for the user. In accordance with an embodiment, the one or more output preferences may comprise an audio message, a visual message, a tactile message, and/or a combination thereof. In accordance with an embodiment, based on the one or more input parameters associated with the user, the processor 202 may be configured to automatically register the one or more output preferences for the plurality of disabilities associated with the user. For example, with reference to Table 1, the output preference (font size) of the emergency alert visual message may be "24" when the user has a profound level of visual disability. Notwithstanding, the scope of the disclosure is not limited to above mentioned lookup tables for visual and hearing disability. In accordance with an embodiment, similar lookup tables may be maintained for other types of disabilities, without deviation from the scope of the disclosure.

In accordance with an embodiment, the one or more input parameters may further include a language preference associated with the user. The user may provide the language preference, via the UI displayed on the electronic device 102. In accordance with an embodiment, the speech sensor may be utilized to determine the language preference associated with the user.

In accordance with an embodiment, the one or more input parameters may be associated with a plurality of users. In such a scenario, the electronic device 102 may maintain a user profile for each of the plurality of users. In accordance with an embodiment, the user profile may include at least the one or more input parameters associated with each of the plurality of users. For example, a profile of a first user from the plurality of users may indicate that the first user has a visual disability. Further, a profile of a second user from the plurality of users, may indicate that the second user has a hearing disability.

In accordance with an embodiment, the user may transmit a query to the broadcast server 104, via the transceiver 208. The query may indicate a request to transmit the emergency alert message and the associated metadata of the emergency event. The emergency alert message may comprise information about the emergency event. The emergency alert message may further comprise metadata that includes the time-sensitive information of the emergency event. The time-sensitive information may be indicative of a period for which the information in the emergency alert message is valid. In accordance with an embodiment, the metadata may further comprise data pertaining to the emergency alert messages. For example, the emergency alert message may be "Hurricane warning with wind speed up to 120 mph". In accordance with an embodiment, the metadata in such a scenario may comprise information pertaining to the wind speed. The associated metadata may further include one or more external links associated with the emergency alert message. In accordance with an embodiment, the one or more external links may correspond to web-links of the one or more services from which the information has been extracted by the broadcast server 104. In accordance with an embodiment, the processor 202, via the transceiver 208, may receive the emergency alert message and the associated metadata of the emergency event broadcasted by the broadcast server 104, in response to the query.

In accordance with an embodiment, the broadcast server 104 may be configured to automatically receive information that is related to the emergency event from one or more application servers, such as a weather service provider. Based on the information received from the one or more application servers, the broadcast server 104 may be configured to generate the emergency alert message and the metadata associated with the emergency event. In accordance with an embodiment, the emergency alert message may be recorded offline by an emergency coordinator. In such a case, the emergency coordinator may upload the recorded emergency alert message to the broadcast server 104. Further, the broadcast server 104 may be configured to automatically broadcast the emergency alert message and the associated metadata of the emergency event. A person skilled in the art will understand that the information in the emergency alert message may not be necessarily restricted to the emergency event and has been provided for illustrative purposes and should not be construed to limit the scope of the disclosure.

A person having ordinary skill in the art will also appreciate that the broadcast server 104 may identify the emergency alert message based on the information received from the one or more application servers and a predetermined threshold. For example, from a weather service provider, the broadcast server 104 may determine that current wind speed in a particular geographical area is "80 mph". Further, the predetermined threshold, maintained by the broadcast server 104 is "60 mph". Therefore, the broadcast server 104 may consider the information (about wind speed of "80 mph") as an emergency event.

In accordance with an embodiment, the processor 202, via the transceiver 208, may receive the emergency alert message and the associated metadata of the emergency event. In accordance with an embodiment, the processor 202 may be configured to store the received emergency alert message in the memory 204. In accordance with an embodiment, the memory 204 that may be used to store the received emergency alert message may correspond to a cache memory. In accordance with an embodiment, the size of the cache memory may vary based on the received emergency alert message. Further, the processor 202 may be configured to store a plurality of received emergency alert messages in a sequence that may be based on the metadata associated with each of the received emergency alert messages. For example, each emergency alert message may be associated with an index that may be utilized to determine the sequence of the received emergency alert messages. Such sequential storage of the received emergency alert messages may be used to render the plurality of received emergency alert messages at the electronic device 102 in the order of receipt.

In response to the received emergency alert message and the associated metadata of the emergency event, the message conversion unit 206, in conjunction with the processor 202, may be configured to modify the emergency alert message to the user-accessible format. The modification may be based on the metadata associated with the emergency alert message and the registered one or more output preferences.

In accordance with an embodiment, the one or more input parameters may indicate that the user may have a visual disability. Based on the indicated visual disability, the processor 202 may be configured to register the one or more output preferences as the audio message. In response to the registered one or more output preferences (such as the audio message), the message conversion unit 206 may be configured to convert the emergency alert message into the audio message. The message conversion unit 206 may be configured to utilize the one or more known message conversion techniques, stored in the memory 204, to convert the emergency alert message into a first audio message. The message conversion unit 206 may be further configured to convert the metadata associated with the emergency alert message into a second audio message. In accordance with an embodiment, the message conversion unit 206 may be configured to combine the first audio message and the second audio message.

In accordance with an embodiment, the message conversion unit 206 may be further configured to control one or more audio properties of the first audio message, the second audio message, or a combination thereof. Examples of the one or more audio properties may comprise bass, treble, pitch shift, loudness equalization, virtual surround, voice cancellation, and/or the like, related to the first and/or the second audio message. In accordance with an embodiment, the message conversion unit 206 may be further configured to control one or more audio properties of the first audio message and/or the second audio message, based on one or more environmental factors and the one or more input parameters. Examples of the one or more environmental factors may comprise a background noise, a location of the electronic device 102, an altitude at which the electronic device 102 is located, and/or the like. In accordance with an embodiment, the processor 202 may determine such one or more environmental factors based on the reading of the one or more sensors associated with the electronic device 102. A person skilled in the art may understand that the example of the user with visual disability has been provided for illustrative purposes and should not be construed to limit the scope of the disclosure.

In accordance with an embodiment, the one or more input parameters may indicate that the user has a hearing disability. Based on the indicated hearing disability, the processor 202 may be configured to register the one or more output preferences, such as "Visual message preferred". In response to the registered one or more output preferences, the message conversion unit 206 may be configured to convert the emergency alert message into the visual message. The message conversion unit 206 may be configured to utilize one or more known message conversion techniques (stored in the memory 204) to convert the emergency alert message into a first visual message. The message conversion unit 206 may be further configured to convert the metadata associated with the emergency alert message into a second visual message. In accordance with an embodiment, the message conversion unit 206 may be configured to combine the first visual message and the second visual message. In accordance with an embodiment, the first visual message and the second visual message may comprise textual content, graphical content, and/or a combination thereof.

In accordance with an embodiment, the message conversion unit 206 may be further configured to control one or more visual properties of the first visual message and/or the second visual message. Examples of the one or more visual properties may comprise bold, underline, font size, font style, and the like, related to the first and/or the second visual message. In accordance with an embodiment, the message conversion unit 206 may be further configured to control one or more visual properties of the first visual message and/or the second visual message, based on one or more environmental factors and the one or more input parameters. An example of the one or more environmental factors may comprise an ambient illumination. A person skilled in the art may understand that the example of the user with hearing disability has been provided for illustrative purposes and should not be construed to limit the scope of the disclosure.

In accordance with an embodiment, the one or more input parameters may indicate that the user has a cognitive disability. Based on the indicated cognitive disability, the processor 202 may be configured to register the one or more output preferences, such as "Increase audio volume, simplify visual text and use graphical icons", to adjust playback of the audio-visual message. In response to the registered one or more output preferences, the message conversion unit 206 may be configured to convert the emergency alert message into a first audio-visual message. The message conversion unit 206 may be further configured to convert the metadata associated with the emergency alert message into a second audio-visual message, in response to the registered one or more output preferences. The first audio-visual message and the second audio-visual message may comprise textual content, graphical content, audio content, and/or a combination thereof. In accordance with an embodiment, the message conversion unit 206 may be configured to combine the first audio-visual message and the second audio-visual message. A person skilled in the art may understand that the example of the user with cognitive disability has been provided for illustrative purposes and should not be construed to limit the scope of the disclosure.

In accordance with an embodiment, the one or more input parameters may indicate that the user has moderate level of both visual disability and hearing disability. For example, the acuity strength of the user is "20/50" and the hearing range is "56 to 70 dB" that may indicate that level of visual and hearing disability is moderate. Based on the one or more input parameters, the one or more registered output preferences may correspond to the visual message and the audio message. Further, the processor 202 may control the one or more visual properties associated with the visual message and the one or more audio properties associated with the audio message. For example, the font size of the visual message may be increased to "18" and the volume of the audio message may be controlled such that the hearing range of the audio message is greater than the hearing range (that is "56 dB to 70 dB") of the user.

In accordance with an embodiment, the registered one or more output preferences may correspond to the tactile message, based on the one or more input parameters. If the one or more input parameters indicate that the user has severe level, such as "95 percent", of hearing and visual disability, the message conversion unit 206 may be configured to convert the emergency alert message to a tactile message, such as a braille message. The message conversion unit 206 may be further configured to transmit the tactile message, such as the braille message, to the tactile message reader, such as a braille reader. A person skilled in the art may understand that the example of the user that has both the hearing and visual disability has been provided for illustrative purposes and should not be construed to limit the scope of the disclosure.

In response to the modification of the emergency alert message and the metadata associated with the emergency alert message based on the registered one or more output preferences, the processor 202 may be configured to communicate the modified emergency alert message and the associated metadata to the user. In accordance with an embodiment, the modified emergency alert message and the associated metadata may be communicated to the user, via the input/output unit 210 (such as the display screen and/or speakers) of the electronic device 102. In an alternate embodiment, the processor 202 may be configured to transmit the modified emergency alert message and the associated metadata to another electronic device.

After the time-sensitive information provided in the emergency alert message expires, the broadcasted emergency alert message and the associated metadata of the emergency event may be revoked from the electronic device 102 by the broadcast server 104. The expired time-sensitive information may correspond to the period of time associated with the broadcasted emergency alert.

Figure 3:
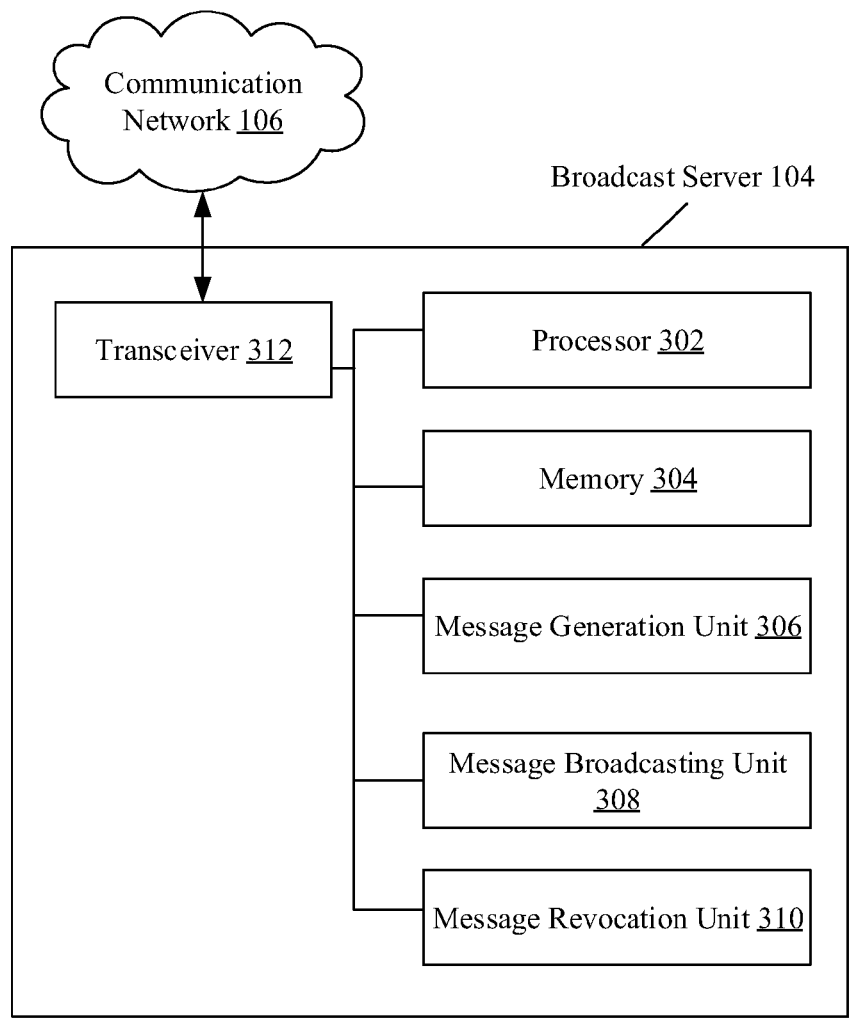
FIG. 3 is a block diagram that illustrates various components of a broadcast server that communicates an emergency alert message, in accordance with an embodiment of the disclosure.

FIG. 3 is a block diagram that illustrates various components of a broadcast server that communicates an emergency alert message, in accordance with an embodiment of the disclosure. With reference to FIG. 3, there is shown the broadcast server 104. The broadcast server 104 may comprise one or more processors, such as a processor 302. The broadcast server 104 may further comprise a memory 304, a message generation unit 306, a message broadcasting unit 308, a message revocation unit 310, and a transceiver 312. The processor 302 may be communicatively coupled to the memory 304, the message generation unit 306, the message broadcasting unit 308, the message revocation unit 310, and the transceiver 312.

The processor 302 may comprise suitable logic, circuitry, interfaces, and/or code that may be configured to execute a set of instructions stored in the memory 304. The processor 302 may be implemented based on a number of processor technologies known in the art. Examples of the processor 302 may be an X86-based processor, a Reduced Instruction Set Computing (RISC) processor, an Application-Specific Integrated Circuit (ASIC) processor, a Complex Instruction Set Computing (CISC) processor, and/or other processor.

The memory 304 may comprise suitable logic, circuitry, interfaces, and/or code that may be configured to store the set of instructions that may be executed by the processor 302. The memory 304 may be further configured to store one or more message generation, message broadcasting and message revocation techniques. The memory 304 may be implemented based on a Random Access Memory (RAM), a Read-Only Memory (ROM), a Hard Disk Drive (HDD), a storage server, and/or a Secure Digital (SD) card.

The message generation unit 306 may comprise suitable logic, circuitry, interfaces, and/or code that may be configured to generate the emergency alert message. The generated emergency alert message may comprise alphanumeric characters, graphical elements (such as warning illustrations and alert icons), audio clips, video clips, external links, and/or a combination thereof.

The message broadcasting unit 308 may comprise suitable logic, circuitry, interfaces, and/or code that may be configured to transmit signals, such as audio and/or video signals, as a compressed bit stream to the plurality of electronic devices, via the transceiver 312. The message broadcasting unit 308 may be implemented by known technologies in the art, such as Advanced Television Systems Committee (ATSC), Digital Video Broadcasting (DVB), and/or the like.

The message revocation unit 310 may comprise suitable logic, circuitry, interfaces, and/or code that may be configured to revoke the emergency alert message broadcasted to the electronic device 102 when the time sensitive information in the associated metadata expires. In an embodiment, the message revocation unit 310 may utilize known techniques in the art, such as revoking descrambling privileges for the broadcasted message, for such revocation.

The transceiver 312 may comprise suitable logic, circuitry, interfaces, and/or code that may be configured to transmit the emergency alert message and associated metadata of the emergency event to the plurality of electronic devices, via the communication network 106. The transceiver 312 may implement known technologies to support wired or wireless communication with the communication network 106. The transceiver 312 may include various components, similar to the electronic components in the transceiver 208. The transceiver 312 may communicate, via wireless communication, with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, as described in FIG. 2.

In operation, the broadcast server 104 may be associated with one or more other servers, such as a social networking server, a live-streaming server, and/or an application server, to retrieve the emergency alert messages. In accordance with an embodiment, the transceiver 312 may automatically receive information that is related to the emergency event from one or more application servers, such as a weather service provider, via the communication network 106. In accordance with an embodiment, the transceiver 312 may receive one or more readings from the one or more emergency sensors installed at one or more locations. Examples of such one or more emergency sensors may comprise, but are not limited to, an air pressure sensor, an anemometer, and an acoustic sensor. The transceiver 312 may be configured to transmit the received information to the processor 302.

Based on the received information, the processor 302 may be configured to detect an emergency event. Accordingly, the processor 302, in conjunction with the message generation unit 306, may be configured to generate an emergency alert message and the metadata associated with the emergency event. In accordance with an embodiment, the processor 302, in conjunction with the message generation unit 306, may be configured to generate the emergency alert message and the metadata associated with the emergency event, based on the information received from the one or more application servers. The processor 302 may be configured to store the generated emergency alert message and the associated metadata in the memory 304.

In accordance with an embodiment, the processor 302, in conjunction with the message broadcasting unit 308, may be configured to broadcast the generated emergency alert message and associated metadata of the emergency event to a plurality of electronic devices that include the electronic device 102. The generated emergency alert message and the associated metadata of the emergency event may be broadcasted to the plurality of electronic devices, via the transceiver 312 and the communication network 106. In accordance with an embodiment, the processor 302 may determine time-sensitive information of the emergency event from the associated metadata. In accordance with an embodiment, the processor 302, in conjunction with the message revocation unit 310, may be configured to communicate revocation signals to the transceiver 312 when the time-sensitive information (as specified in the associated metadata) expires. The transceiver 312 may transmit the revocation signals to the electronic device 102. Based on the revocation signals, the broadcasted emergency alert message and the associated metadata of the emergency event may be revoked.

Figure 4:
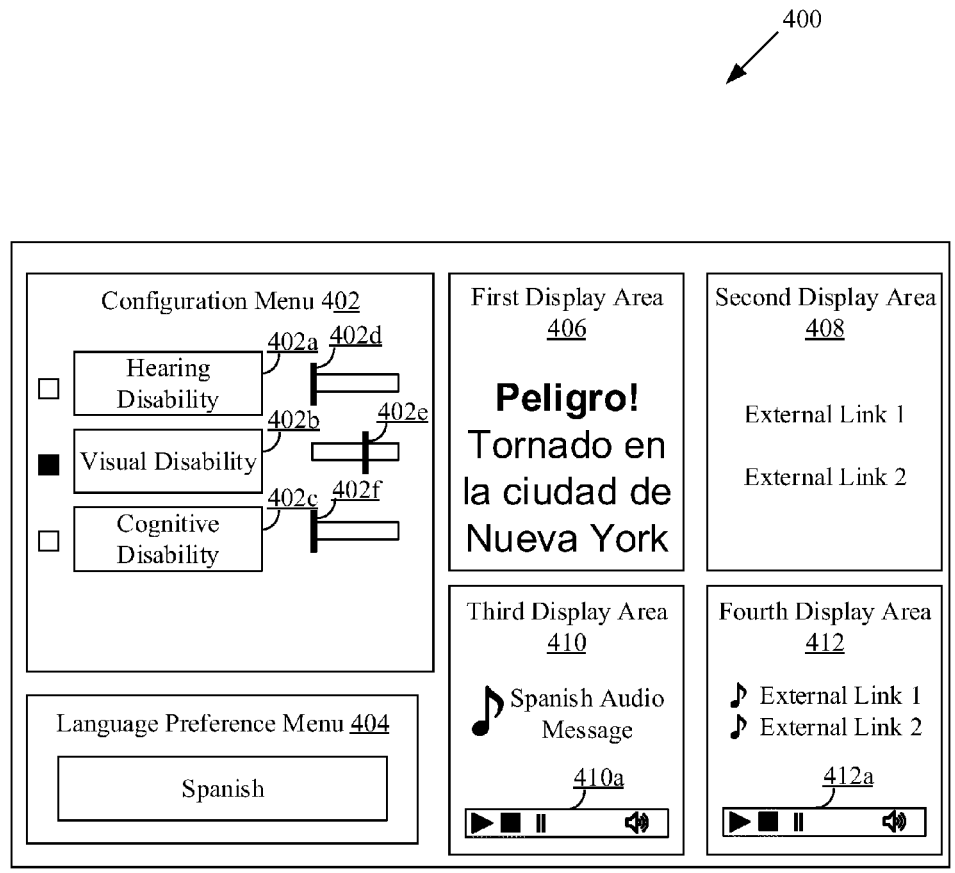
FIG. 4 illustrates an exemplary scenario of a user-interface (UI) that may be presented on the electronic device, in accordance with an embodiment of the disclosure.

FIG. 4 illustrates an exemplary scenario of a user-interface (UI) that may be presented on an electronic device, in accordance with an embodiment of the disclosure. FIG. 4 is described in conjunction with elements of FIG. 1 and FIG. 2. With reference to FIG. 4, there is shown a UI 400 presented on the display screen of the electronic device 102. The UI 400 may include a configuration menu 402, a language preference menu 404, a first display area 406, a second display area 408, a third display area 410, and a fourth display area 412.

With reference to FIG. 4, the configuration menu 402 may comprise one or more selection boxes, such as 402*a*, 402*b*, and 402*c*. The selection boxes 402*a*, 402*b*, and 402*c* may respectively correspond to the visual disability, the hearing disability, and the cognitive disability of the user. There is further shown three sliders 402*d*, 402*e*, and 402*f* that correspond to the selection boxes 402*a*, 402*b*, and 402*c*, respectively. In accordance with an embodiment, the UI 400 may display one or more of the sliders 402*d*, 402*e*, and 402*f* based on corresponding selection of the selection boxes 402*a*, 402*b*, and 402*c*, respectively. The third display area 410 and the fourth display area 412 may further comprise a first audio control menu 410*a* and a second audio control menu 412*a*, respectively.

The configuration menu 402 and the language preference menu 404 may be utilized by the user to provide the one or more input parameters. The user may select one or more of the selection boxes 402*a*, 402*b*, and 402*c*, based on the type of disability associated with the user. The user may provide the level of disability associated with the one or more selection boxes 402*a*, 402*b*, and 402*c*, by use of the respective sliders 402*d*, 402*e*, and/or 402*f*. The first display area 406 may correspond to an area on the display screen of the electronic device 102, to display the first visual message. The second display area 408 may correspond to an area on the display screen of the electronic device 102, to display the second visual message. The third display area 410 may correspond to an area on the display screen (of the electronic device 102) that may comprise the first audio control menu 410*a*. The first audio control menu 410*a* may be utilized to control the one or more audio properties associated with the first audio message. The fourth display area 412 may correspond to an area on the display screen (of the electronic device 102) that may comprise the second audio control menu 412*a*. The second audio control menu 412*a* may be utilized to control the one or more audio properties associated with the second audio message.

In an exemplary scenario, the user may have low level of visual disability, and thus a normal emergency alert message broadcasted by the broadcast server 104 may not be perceived by the user. In an instance, the user may utilize the configuration menu 402 displayed at the electronic device 102 to indicate the type and level of disability of the user. Thus, the user may perform an input operation on the selection box 402*b*. In response to the input operation on the selection box 402*b*, the configuration menu 402 may display the slider 402*e* associated with the selection box 402*b*. The user may indicate the level of disability associated with the user, via the slider 402*e*. For example, the user may adjust the slider 402*e* to indicate that the level of visual disability is severe. Alternatively, the user may indicate the level of visual disability based on an acuity strength specified by the user in a text box (not shown). Alternatively, the level of disability of the user may be automatically determined by the electronic device 102 based on one or more sensors installed within the electronic device 102. For example, the one or more sensors may detect that the acuity strength of the user is "20/400". Alternatively, the level of disability of the user may be automatically determined by the electronic device 102 based on one or more visual and sensory samples determined by one or more hardware and/or software units within the electronic device 102.

Based on the type of disability and the associated level of disability, the electronic device 102 may be configured to determine the one or more output preferences. In accordance with the exemplary scenario, the type of disability is visual disability and the level of visual disability is low, such as "60 percent". Thus, the electronic device 102 may determine that the one or more output preferences may include the audio message and/or the visual message. Further, the electronic device 102 may determine one or more properties of the visual message that may be required to be modified based on the level of visual disability of the user. The user may also provide the language preference via the language preference menu 404. In an instance, the user may indicate that the language preference is Spanish language.

In accordance with the exemplary scenario, the broadcast server 104, in conjunction with a weather service provider, may determine an emergency event, such as a tornado, that may develop in a city area within next "2 hours". In such a case, the broadcast server 104 may broadcast an emergency alert message, such as "Danger! Tornado in New York City". The broadcast server 104 may further broadcast metadata associated with the emergency alert message.

The emergency alert message and the metadata may be received by the electronic device 102. Based on the determined one or more output preferences and language preference, the electronic device 102 may convert the received emergency alert message into the visual message and the audio message. Based on the level of disability specified by the user, the electronic device 102 may modify the one or more properties of the visual message and the audio message. Additionally, the electronic device 102 may modify the received emergency alert message based on the language preference of the user.

In accordance with the exemplary scenario, based on the one or more input parameters, the electronic device 102 may perform modification of the emergency alert message by conversion of the emergency alert message into the visual message in the Spanish language, such as "Peligro! Tornado en la ciudad de Nueva York". Further, as the level of visual disability of the user is "60 percent", the electronic device 102 may be configured to increase a font size that corresponds to one or more properties of the visual message. The electronic device 102 may further modify the emergency alert message and convert the emergency alert message into an audio message in Spanish language.

After the modification of the emergency alert message into the visual message and the audio message, the visual message may be displayed to the user in the first display area 406. Additionally, the metadata associated with the emergency alert message may be modified, based on the one or more input parameters. Accordingly, the modified metadata may be displayed to the user in the second display area 408. In an instance, the metadata may be "External link 1" and "External link 2" that may redirect the user to web-links of the weather service portal for additional details about the emergency event.

Further, the first audio control menu 410*a* in the third display area 410 may be enabled and utilized by the user to control the playback of the audio message. The audio message may be presented to the user, to playback the audio message in Spanish language. Additionally, the audio metadata associated with the emergency alert message may be modified, based on the one or more input parameters. Accordingly, the second audio control menu 412*a* associated with modified audio metadata may be displayed to the user in the fourth display area 412. The second audio control menu 412*a* may be enabled and utilized by the user to control the playback of the modified audio metadata. In accordance with an embodiment, the modified audio metadata may include audio messages that may correspond to the web-links, such as "External link 1" and "External link 2", of the weather service portal for additional details about the emergency event. A person skilled in the art will understand that the UI 400 and the exemplary scenario is described herein for illustrative purposes and should not be construed to limit the scope of the disclosure.

Figure 5:
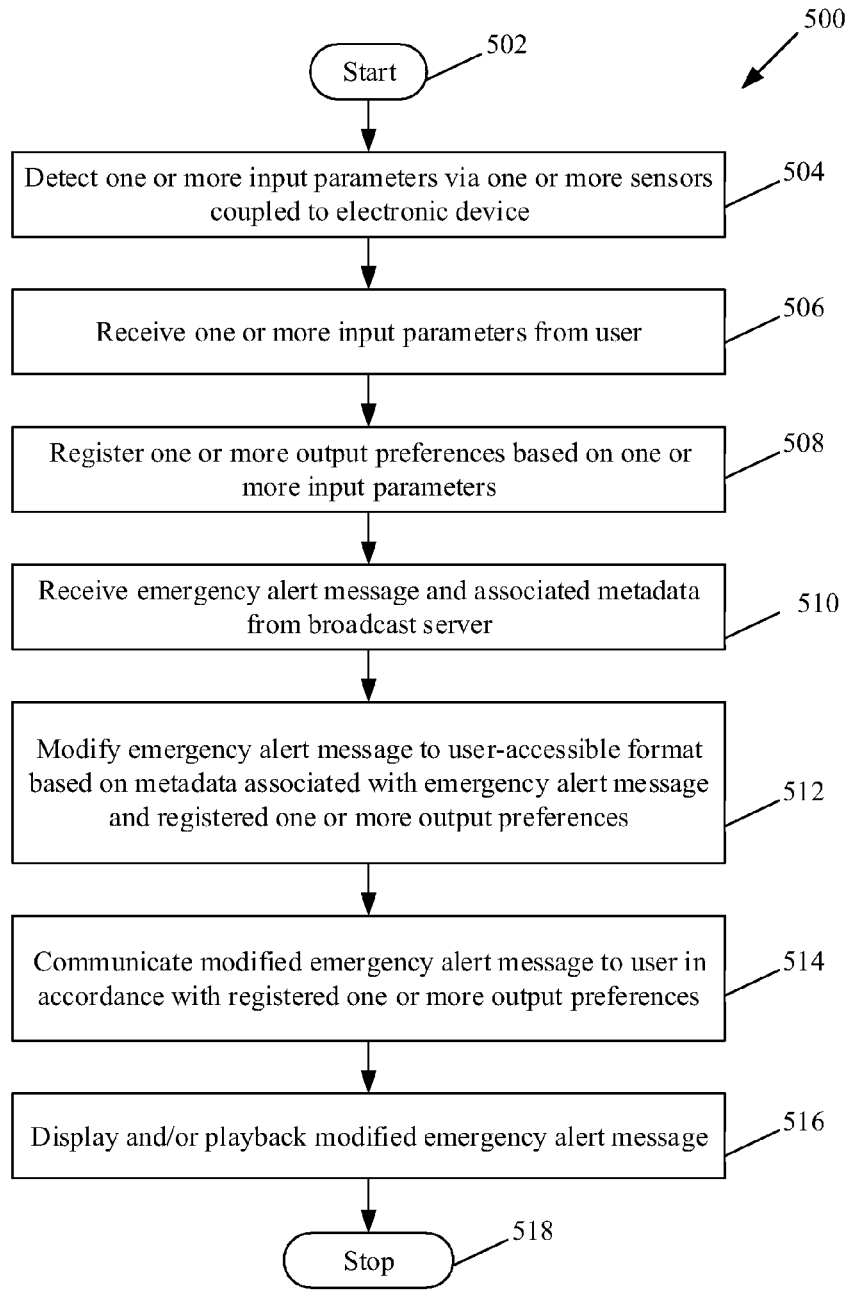
FIG. 5 is an exemplary flow chart that illustrates a method for communication of an emergency alert message in a user-accessible format, in accordance with an embodiment of the disclosure.

FIG. 5 is an exemplary flow chart that illustrates a method implemented at an electronic device to communicate the emergency alert message in the user-accessible format, in accordance with an embodiment of the disclosure. FIG. 5 is described in conjunction with elements of FIG. 1 and FIG. 2. With reference to FIG. 5, there is shown an exemplary flow chart 500 that illustrates a method implemented at the electronic device 102 to communicate the emergency alert message to a user in the user-accessible format. The method begins at step 502 and proceeds to step 504.

At step 504, one or more input parameters may be detected, via one or more sensors coupled to the electronic device 102. At step 506, one or more input parameters may be received from the user of the electronic device 102. At step 508, the one or more output preferences may be registered by the electronic device 102 based on the one or more input parameters.

At step 510, the emergency alert message may be received from the broadcast server 104. At step 512, in response to the received emergency alert message, the electronic device 102 may be configured to modify the received emergency alert message to the user-accessible format, based on the metadata associated with the emergency alert message and the registered one or more output preferences.

At step 514, the modified emergency alert message may be communicated to the user in accordance with the registered one or more output preferences. In accordance with an embodiment, the modified emergency alert message may be transmitted to another electronic device in order to communicate the modified emergency alert message to the user. At step 516, the electronic device 102 may be configured to display and/or playback the modified emergency alert message. Control passes to end step 518.

Figure 6:
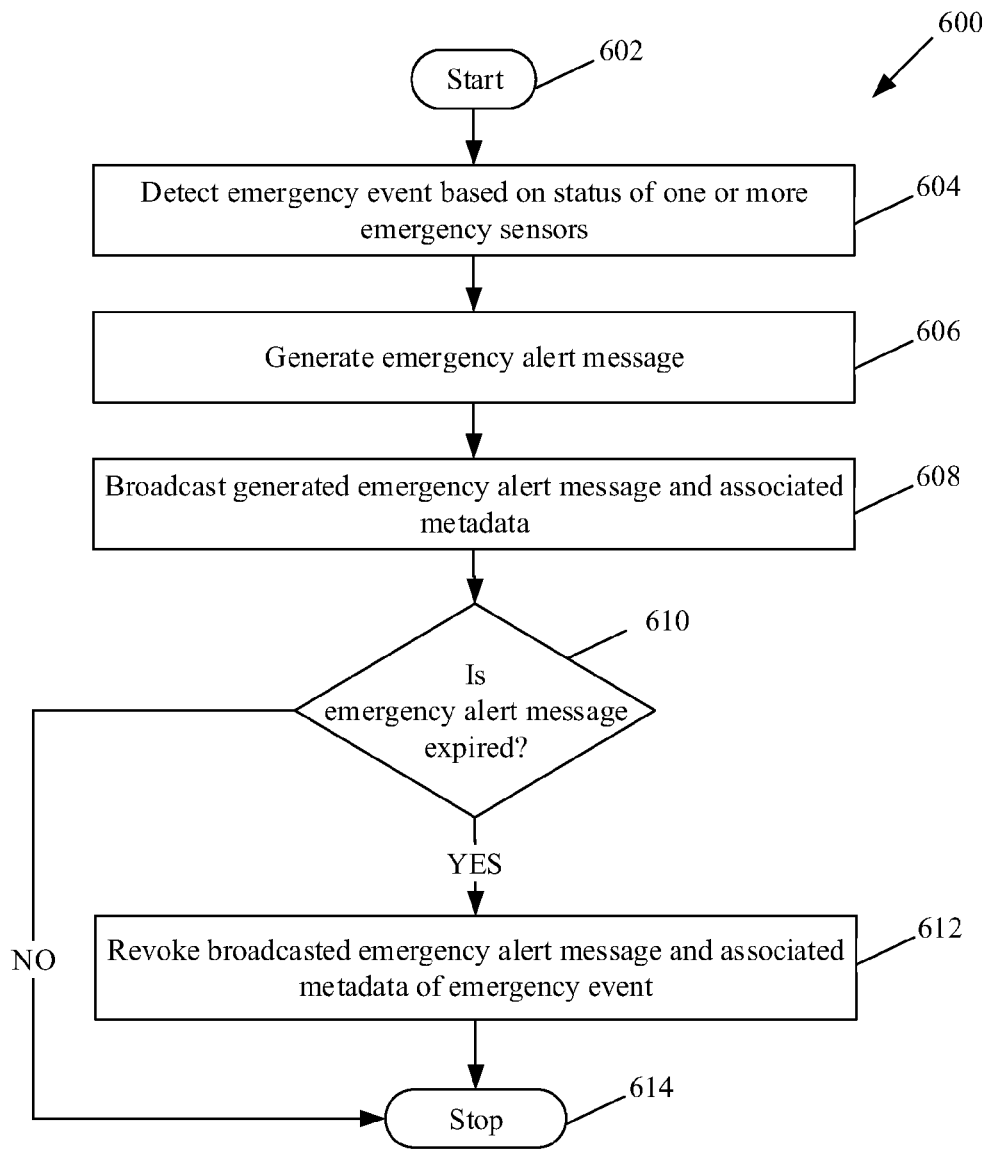
FIG. 6 is another exemplary flow chart that illustrates another method for communication of an emergency alert message, in accordance with an embodiment of the disclosure.

FIG. 6 is another exemplary flow chart that illustrates another method implemented at a broadcast server to communicate the emergency alert message, in accordance with an embodiment of the disclosure. FIG. 6 is described in conjunction with elements of FIG. 1 and FIG. 3. With reference to FIG. 6, there is shown an exemplary flow chart 600 that illustrates a method implemented at the broadcast server 104 to communicate the emergency alert message. The method begins at step 602 and proceeds to step 604.

At step 604, an emergency event may be detected based on status of one or more emergency sensors installed at one or more locations. The broadcast server 104 may receive one or more readings from the one or more emergency sensors. The emergency event may be further detected based on other methods, as described in FIGS. 2 and 3. At step 606, an emergency alert message and associated metadata of an emergency event may be generated. At step 608, the emergency alert message and the associated metadata may be broadcasted to a plurality of electronic devices that include the electronic device 102. At step 610, it may be determined whether the time-sensitive information specified in the metadata has expired. In instances when the time-sensitive information specified in the metadata has not expired, the control passes to end step 614. In instances when the time-sensitive information specified in the metadata has expired, the control passes to step 612. At step 612, when the time-sensitive information specified in the metadata expires, the broadcasted emergency alert message and the associated metadata of the emergency event may be revoked. Control passes to end step 614.

In accordance with an embodiment of the disclosure, a system to communicate the emergency alert message in the user accessible format may comprise a broadcast server 104 (FIG. 1) and an electronic device 102 (FIG. 1). The electronic device 102 may be communicatively coupled to the broadcast server 104, via the communication network 106. The electronic device 102 may comprise one or more processors, such as the processor 202 (FIG. 2). The processor 202 may be configured to register one or more output preferences based on one or more input parameters provided by a user. The processor 202 may be further configured to receive the emergency alert message and associated metadata of an emergency event from the broadcast server 104. In accordance with an embodiment, the associated metadata may include time-sensitive information of the emergency event. The processor 202 may be further configured to modify the received emergency alert message to a user accessible format based on the associated metadata and the registered one or more output preferences. The processor 202 may be further configured to communicate the modified emergency alert message to the user in accordance with the registered one or more output preferences.

In accordance with an embodiment of the disclosure, a system to communicate the emergency alert message in the user accessible format may comprise a broadcast server 104 (FIG. 1) and an electronic device 102 (FIG. 1). The electronic device 102 may be communicatively coupled to the broadcast server 104, via the communication network 106. The broadcast server 104 may comprise one or more processors, such as the processor 302 (FIG. 3). The processor 302 may be configured to broadcast an emergency alert message and associated metadata of an emergency event. In accordance with an embodiment, the associated metadata may include time-sensitive information of said emergency event. In accordance with an embodiment, the processor 302 may modify the broadcasted emergency alert message to a user-accessible format based on the associated metadata and one or more output preferences registered at each of a plurality of electronic devices. In accordance with an embodiment, the one or more output preferences may be registered based on one or more input parameters provided by a user. In accordance with an embodiment, the processor 302 may revoke the broadcasted emergency alert message and associated metadata of the emergency event after expiry of the time-sensitive information.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for emergency alert messaging. The at least one code section in an electronic device 102 may cause the machine and/or computer to perform the steps, which may comprise registration of one or more output preferences based on one or more input parameters provided by a user. The computer may further receive an emergency alert message and associated metadata of an emergency event from the broadcast server 104. In accordance with an embodiment, the associated metadata includes time-sensitive information of the emergency event. The computer may be further configured to modify the received emergency alert message to a user-accessible format, based on the associated metadata and the registered one or more output preferences. The computer may be further configured to communicate the modified emergency alert message to the user, in accordance with the registered one or more output preferences.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that have information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments that fall within the scope of the appended claims.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented by use of a wide variety of suitable processes and system modules, and are not limited to any particular computer hardware, software, middleware, firmware, microcode, and the like. The claims can encompass embodiments for hardware and software, or a combination thereof.

What is claimed is:

1. A system for communication of emergency alert, said system comprising:
   a broadcast server; and
   a first electronic device in communication with said broadcast server,
   wherein said first electronic device comprises one or more circuits configured to:
     register output preference information of a user, based on at least one input parameter that corresponds to information associated with said user;
     receive from said broadcast server, a first emergency alert message and first metadata associated with said first emergency alert message;
     modify a first format of said first emergency alert message to a first user-accessible format, based on said first metadata and said registered output preference information;
     generate a second emergency alert message that has said first user-accessible format, based on said modification of said first format of said first emergency alert message;
     modify a second format of said first metadata to a second user-accessible format different from said first user-accessible format, based on said output preference information;
     generate second metadata that has said second user-accessible format, based on said modification of said second format of said first metadata;
     aggregate, as a third emergency alert message, said second emergency alert message and said second metadata; and
     communicate said third emergency alert message to said user.

2. The system of claim 1, wherein said one or more circuits are further configured to display said third emergency alert message on a display device.

3. The system of claim 1, wherein said one or more circuits are further configured to:
   receive said at least one input parameter from at least one sensor,
   wherein said at least one sensor detects said at least one input parameter, and
   wherein said at least one sensor is in communication with said first electronic device.

4. The system of claim 1, wherein said one or more circuits are further configured to transmit said third emergency alert message to a second electronic device.

5. The system of claim 1, wherein said third emergency alert message is an audio message.

6. The system of claim 5, wherein said one or more circuits are further configured to:
   control at least one audio property of said audio message, based on at least one environmental factor and said at least one input parameter,
   wherein said at least one environmental factor comprises at least one of a background noise, a location of said first electronic device, or an altitude of said first electronic device.

7. The system of claim 1, wherein said third emergency alert message is a visual message.

8. The system of claim 7, wherein said one or more circuits are further configured to control at least one visual property of said visual message, based on ambient illumination information and said at least one input parameter.

9. The system of claim 7, wherein said visual message comprises at least one of a textual content or a graphical content.

10. The system of claim 1, wherein said third emergency alert message is a tactile message.

11. The system of claim 10, wherein said one or more circuits are further configured to transmit said tactile message to a tactile message reader.

12. The system of claim 1,
    wherein said at least one input parameter corresponds to a disability associated with said user, and
    wherein said disability comprises at least one of a visual disability, a hearing disability, or a cognitive disability.

13. The system of claim 12, wherein a level of said disability is associated with said at least one input parameter.

14. The system of claim 1, wherein said output preference information comprises at least one of an audio message, a visual message, or a tactile message.

15. A system for communication of emergency alert, said system comprising:
    a broadcast server in communication with an electronic device, wherein said broadcast server comprises at least one first circuit configured to:
      broadcast a first emergency alert message and first metadata associated with said first emergency alert message;
      wherein said first metadata includes time-sensitive information of an emergency event associated with said first emergency alert message; and
    said electronic device comprising at least one second circuitry configured to:
      register output preference information of a user, based on at least one input parameter that corresponds to information associated with said user;
      receive said first emergency alert message and said first metadata associated with said first emergency alert message;
      modify a first format of said first emergency alert message to a first user-accessible format, based on said first metadata and said output preference information;
      generate a second emergency alert message that has said first user-accessible format, based on said modification of said first format of said first emergency alert message;
      modify a second format of said first metadata to a second user-accessible format different from said first user-accessible format, based on said output preference information;

generate second metadata that has said second user-accessible format, based on said modification of said second format of said first metadata;

aggregate, as a third emergency alert message, said second emergency alert message and said second metadata, wherein said at least one first circuit is further configured to revoke said first emergency alert message and said first metadata, based on expiry of said time-sensitive information.

16. A method for communicating emergency alert, said method comprising:

in an electronic device:

registering output preference information of a user, based on at least one input parameter that corresponds to information associated with said user;

receiving from a broadcast server, a first emergency alert message of an emergency event and first metadata associated with said first emergency alert message;

modifying a first format of said first emergency alert message to a first user-accessible format based on said first metadata and said registered output preference information;

generating a second emergency alert message that has said first user-accessible format, based on said modification of said first format of said first emergency alert message;

modifying a second format of said first metadata to a second user-accessible format different from said first user-accessible format, based on said output preference information;

generating second metadata that has said second user-accessible format, based on said modification of said second format of said first metadata;

aggregating, as a third emergency alert message, said second emergency alert message and said second metadata; and communicating said third emergency alert message to said user.

17. The method of claim 16, wherein said third emergency alert message is an audio message.

18. The method of claim 16, said third emergency alert message is a visual message.

19. The method of claim 16, said third emergency alert message is a tactile message.

20. A method for communicating emergency alert, said method comprising:

broadcasting, by a broadcast server, a first emergency alert message and first metadata associated with said first emergency alert message, wherein said first metadata includes time-sensitive information of an emergency event associated with said first emergency alert message;

registering, by an electronic device in communication with the broadcast server, output preference information of a user, based on at least one input parameter that corresponds to information associated with said user;

receiving, by said electronic device, said first emergency alert message and said first metadata associated with said first emergency alert message;

modifying, by said electronic device, a first format of said first emergency alert message to a first user-accessible format, based on said first metadata and said output preference information;

generating, by said electronic device, a second emergency alert message that has said first user-accessible format, based on said modification of said first format of said first emergency alert message;

modifying, by said electronic device, a second format of said first metadata to a second user-accessible format different from said first user-accessible format, based on said output preference information;

generating, by said electronic device, second metadata that has said second user-accessible format, based on said modification of said second format of said first metadata;

aggregating, by said electronic device, as a third emergency alert message, said second emergency alert message and said second metadata; and revoking, by said broadcast server, said first emergency alert message and said first metadata, based on expiry of said time-sensitive information.

21. The system of claim 1, wherein said broadcast server identifies an emergency event associated with said first emergency alert message, based on a comparison of emergency information from at least one application server and a threshold value.

22. The system of claim 15, wherein said at least one first circuit is further configured to identify said emergency event, based on a comparison of emergency information from at least one application server and a threshold value.

23. The system of claim 1, wherein said output preference information is associated with communication of said third emergency alert message to said user.

24. The system of claim 1, wherein said first metadata includes time-sensitive information of an emergency event associated with said first emergency alert message.

* * * * *